United States Patent [19]

Anderson

[11] 4,374,608
[45] Feb. 22, 1983

[54] FIBER OPTIC CABLE

[75] Inventor: Gene S. Anderson, Elburn, Ill.

[73] Assignee: Belden Corporation, Geneva, Ill.

[21] Appl. No.: 217,230

[22] Filed: Dec. 17, 1980

Related U.S. Application Data

[63] Continuation of Ser. No. 9,536, Feb. 5, 1979, abandoned.

[51] Int. Cl.³ .............................................. G02B 5/14
[52] U.S. Cl. .................................................. 350/96.23
[58] Field of Search ...................................... 350/96.23

[56] References Cited

U.S. PATENT DOCUMENTS

| | | | |
|---|---|---|---|
| 3,691,001 | 9/1972 | Takahashi et al. | 350/96.23 |
| 3,766,307 | 10/1973 | Andrews, Jr. et al. | 350/96.23 |
| 3,855,897 | 12/1974 | Takahashi et al. | 350/96.23 X |
| 4,078,853 | 3/1978 | Kempf | 350/96.23 |
| 4,097,119 | 6/1978 | Kumamaru et al. | 350/96.23 |

FOREIGN PATENT DOCUMENTS

| | | | |
|---|---|---|---|
| 2628069 | 11/1977 | Fed. Rep. of Germany | 350/96.23 |
| 2628070 | 11/1977 | Fed. Rep. of Germany | 350/96.23 |

OTHER PUBLICATIONS

"Fiber Optics Cable has High Resistance to Mechanical Stresses", Computer Design, Aug. 1976, p. 52.

*Primary Examiner*—John D. Lee
*Assistant Examiner*—Frank Gonzalez
*Attorney, Agent, or Firm*—Fitch, Even, Tabin, Flannery & Welsh

[57] ABSTRACT

A fiber optic cable and method for making same wherein the cable includes at least one elongate fiber optic element, a nonmetallic tubular shield disposed substantially coaxially along the length of the fiber optic element, and a nonmetallic braided strength member disposed coaxially along the length of the tubular shield layer in tight fitting relation thereon. The braided strength member is selected to have greater tensile strength and lower elongation per unit length than the fiber optic element so that any tensile load applied to the cable is taken substantially by the braided strength member so as to prevent undesirable elongation and damage to the fiber optic element. In a preferred embodiment, an abrasion resistant layer is disposed between the braided strength member and the tubular shield, and a protective jacket is formed over the braided strength member. In another embodiment, a second braided strength member is formed coaxially over the first jacket layer and a second outer protective jacket is formed coaxially over the outer braided strength member.

14 Claims, 6 Drawing Figures

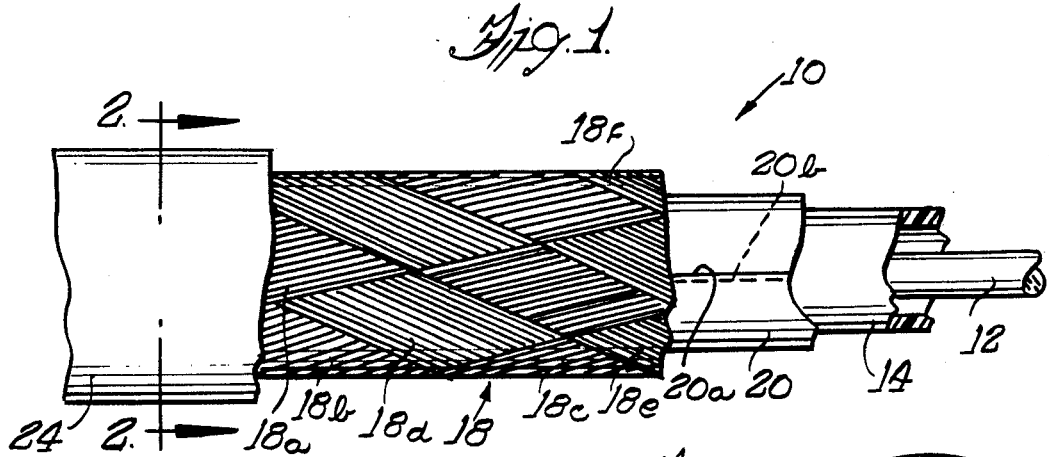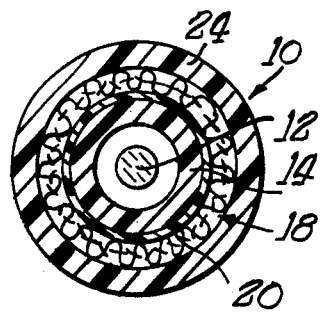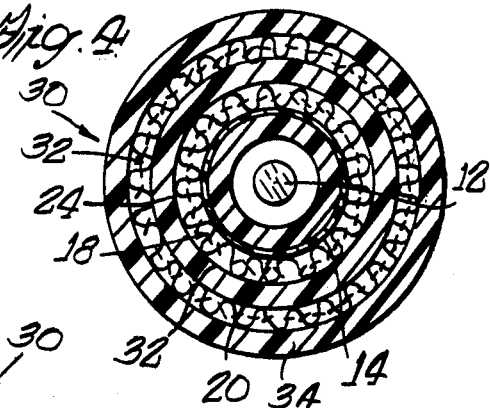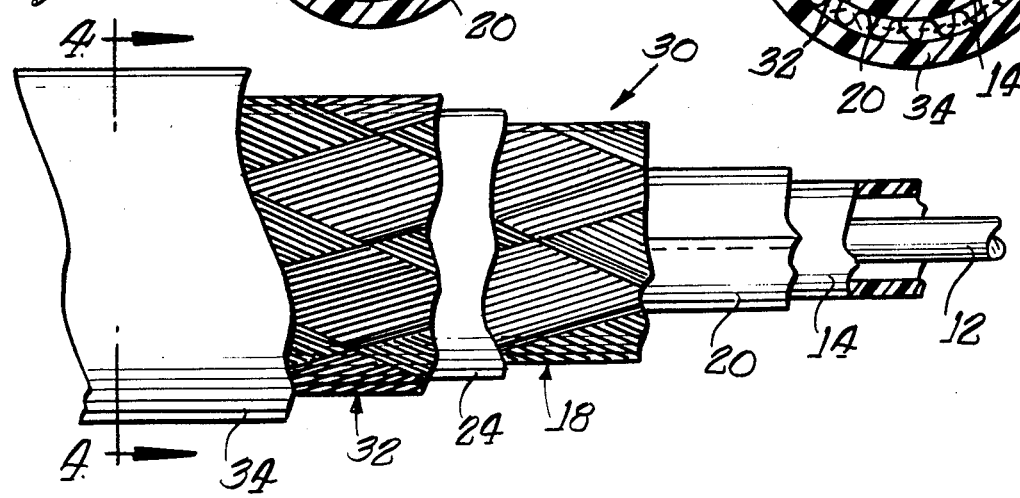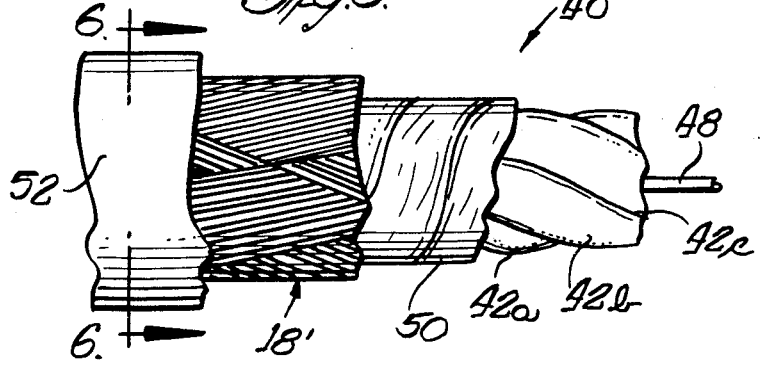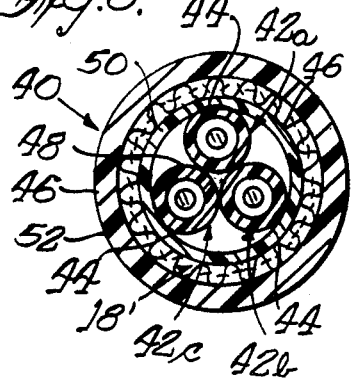

4,374,608

FIBER OPTIC CABLE

This is a continuation of application Ser. No. 9,536, filed Feb. 5, 1979, now abandoned.

BACKGROUND OF THE INVENTION

The present invention relates generally to fiber optic cables, and more particularly to a novel fiber optic cable and method of making the same wherein one or more fiber optic elements are disposed within a nonmetallic tubular shield over which a nonmetallic braided strength member is coaxially formed in tight fitting relation so that an axial load applied to the cable is taken by the braided strength member so as to protect the fiber optic element from undesirable elongation and damage.

The use of low-loss fiber optic cables has found wide acceptance in many industrial and commercial applications, including the fields of computer technology and communications. Low-loss fiber optic cables offer many desirable advantages over metallic conductors including use for long distance transmission without repeaters, immunity from cross talk, greater bandwidth capabilities, lighter weight, and potential for lower cost signal communication systems.

As a practical matter, it has been found that significant problems are encountered which inhibit wide utilization of the desirable features of fiber optic cables over metallic conductors. One basic problem is the inherent fragility of glass fibers which makes more difficult the production of fiber optic cables which are flexible and can withstand bending, twisting, impact, vibration, etc. The basic approach to solving this problem has been to provide means for strengthening and buffering the individual fiber optic elements so that subsequent bundling, cabling and field usage will not damage or adversely affect the optical properties of the fiber optic elements.

As a result of the fragility of the glass fibers employed in fiber optic cables, the glass fibers are capable of withstanding only relatively low elongation per unit length when subjected to tensile loading. Some fiber optic elements will fail by breaking when subjected to approximately 1% elongation while other types of fiber optic elements can withstand approximately 6% elongation without failure. Because the fiber optic elements are capable of withstanding only relatively low elongation, it is known to provide a nonmetallic axial strength member within a fiber optic cable to carry the fiber optic elements so that the axial strength member takes the major portion of any tensile load applied to the cable.

In addition to employing axial strength members within fiber optic cables to prevent the fiber optic elements from being subjected to potentially damaging tensile loads, it is also known to employ nonmetallic strands of suitable strength material externally along the length of a bundle of one or more fiber optic elements in a fiber optic cable to improve the tensile strength characteristics of the cable without damage to the fiber optic elements. In general, however, the nonmetallic strands are positioned in parallel relation to the longitudinal axis of the cable along the length of the cable. One problem with this technique for preventing damaging tensile loading of the fiber optic elements is that during the manufacturing process, some lengths of the reinforcing strands may be longer than other lengths. This results when the fiber optic cable is curved around one or more pulleys or sheaves during manufacture with the result that the high strength strands adjacent the shorter radius of curvature have slightly shorter length than the strands adjacent the outer or larger radius of curvature. When the resulting fiber optic cable is subjected to a tensile load, the shorter reinforcing strands are subjected to greater tensile loading than the longer strands and may fail, thereby causing failure of the fiber optic cable.

SUMMARY OF THE INVENTION

One of the primary objects of the present invention is to provide a novel fiber optic cable and method of making the same wherein the cable includes a nonmetallic braided strength member disposed coaxially along the length of a tube bundle in the form of one or more fiber optic elements carried within a tubular shield, the nonmetallic braided strength member being operative to take any tensile loads applied to the cable so as to prevent damaging elongation and failure of the fiber optic elements.

A more particular object of the present invention is to provide a novel fiber optic cable and method of making the same wherein one or more fiber optic elements are disposed within a tubular nonmetallic shield and a nonmetallic braided strength member is disposed coaxially along the length of the tubular shield in tight fitting relation thereon, the braided strength member having greater tensile strength and lower elongation per unit length than the fiber optic elements so that any axial load applied to the cable is substantially taken by the braided strength member rather than the fiber optic elements.

The use of a textile braid layer in connection with fiber optic cables is not, per se, novel. For example, U.S. Pat. No. 4,147,406 dated Apr. 3, 1979, discloses a fiber optic cable wherein a textile braid is applied coaxially along a plurality of fiber optic bundles to provide improved abrasion resistance for the fiber optic bundles. U.S. Pat. No. 3,691,001, dated Sept. 12, 1972, discloses a fiber optic bundle having an outer protective sheath comprising a cylindrical braid member snugly fitted on the cylindrical surface of an optical fiber bundle and impregnated with a synthetic resin material to form the protective sheath. In somewhat similar fashion, U.S. Pat. No. 3,855,897, dated Dec. 24, 1974, discloses a method of protecting a bundle of flexible optical fibers wherein the fibers are inserted axially into a tubular braid of intertwined filaments which are thereafter axially stretched to decrease the diameter of the braid until it compresses the inserted bundle whereafter the stretched tubular braid is impregnated with a synthetic resin composition and solidified. Neither the aforenoted copending application nor the aforenoted two U.S. patents discloses the use of a nonmetallic braided strength member in a fiber optic cable wherein the nonmetallic braided strength member has greater tensile strength and lower elongation per unit length than the fiber optic elements so that the braided strength member takes any tensile load applied to the cable and prevents damaging tensile loading of the fiber optic elements as intended by the present invention.

In accordance with one feature of the present invention, at least one fiber optic element is disposed within a tubular nonmetallic sheath over which an abrasion resistant layer in the form of a polyester film is coaxially disposed. A nonmetallic braided strength member is braided tightly along the length of the underlying shield layer and interposed abrasion resistant layer, and an outer protective jacket is formed coaxially along the braided strength member. The nonmetallic braided strength member is formed to have greater tensile strength and lower elongation per unit length than the associated fiber optic elements.

In accordance with an alternative embodiment of the invention, a plurality of fiber optic bundles are disposed along the length of an axial nonmetallic strength member and a nonmetallic braided strength member is formed coaxially over the fiber optic bundles in tightly braided relation thereon. The braided strength member is formed to have greater tensile strength and lower elongation per unit length than the fiber optic elements so that the braided strength member takes any tensile loads applied to the fiber optic cable and prevents the fiber optic elements from tensile loading that might cause excessive elongation and failure of the fiber optic elements. Still another embodiment employs a second nonmetallic braided strength member formed coaxially over the length of the tubular jacket, and has a second coaxially disposed outer jacket disposed over the second braid member.

Further objects and advantages of the present invention, together with the organization and manner of operation thereof, will become apparent from the following detailed description of the invention when taken in conjunction with the accompanying drawing wherein like reference numerals designate like elements throughout the several views.

BRIEF DESCRIPTION OF THE DRAWING

FIG. 1 is a fragmentary view of a length of fiber optic cable constructed in accordance with the present invention, various layers of the cable being exposed for purposes of illustration;

FIG. 2 is a transverse sectional view taken substantially along line 2—2 of FIG. 1;

FIG. 3 is a fragmentary longitudinal view similar to FIG. 1 but illustrating an alternative embodiment of a fiber optic cable constructed in accordance with the present invention;

FIG. 4 is a transverse sectional view taken substantially along line 4—4 of FIG. 3;

FIG. 5 is a fragmentary longitudinal view similar to FIG. 1 but illustrating still another embodiment of a fiber optic cable in accordance with the present invention; and FIG. 6 is a transverse sectional view taken substantially along line 6—6 of FIG. 5, looking in the direction of the arrows.

DESCRIPTION OF PREFERRED EMBODIMENTS

Referring now to the drawing, and in particular to FIGS. 1 and 2, a fiber optic cable constructed in accordance with one embodiment of the present invention is indicated generally at 10. The fiber optic cable 10 is made from nonmetallic components and includes an elongate fiber optic element 12 which is of known design and conventionally comprises a fiber optic glass core having a glass or plastic cladding layer formed coaxially over the core to effect the desired refraction. For example, fiber optic elements are commercially available which range in size and elongation from an outer diameter of approximately 0.005 inch and an elongation of approximately 1% for a fiber optic element having a glass core and glass cladding, to a slightly larger size fiber optic element having approximately 5-6% elongation and having a glass core and a plastic cladding layer.

A protective nonmetallic tubular shield 14 is formed by conventional extruding techniques coaxially along the length of the fiber optic element 12 so as to be relatively loose fitting thereon. The nonmetallic tubular shield 14 may, for example, be formed of a suitable polycarbonate material which may be extruded in tubular form over the fiber optic element and, in combination with the fiber optic element, forms a tube bundle. The tubular shield 14 forms a flexible but relatively radially noncompressible protective shield layer for the fiber optic element.

In accordance with an important feature of the invention, a nonmetallic braided tubular strength member, indicated generally at 18, is disposed coaxially along the length of the tubular shield 14 in tight fitting relation thereon. The braided strength member 18 comprises a plurality of tightly braided strands of nonmetallic material such as suitable high strength yarn which has greater tensile strength and lower elongation per unit length than the associated fiber optic element 12. In the illustrated embodiment, the braided strength member 18 comprises an eight strand braid, six strands of which are indicated at 18a–f, wherein the strands are braided so as to establish three picks per inch on a tubular shield 14 having an outer diameter of approximately 0.079 inch. As used herein, the term "pick" refers to the crossing of one braid strand with another. Thus, three picks per inch is defined as three strand crossings per inch, as considered along a longitudinal line or surface element along the braid layer 18. The braided strands 18a–h comprising the eight strand braided strength member 18 are disposed in closely braided relation so as to cover substantially all of the outer circumferential surface of the underlying tubular shield 14, as well as being braided in tight fitting relation on the tubular shield 14.

Alternatively, the braided strength member 18 may comprise a sixteen strand braid formed to establish six picks per inch.

The strands 18a–h comprising the braided strength member 18 may each comprise a high strength yarn having the desired strength characteristics. For example, the individual strands of the braid may be made from a suitable aramid material, an example of which is KEVLAR, a product of Du Pont Company. Making the braided strength member 18 from individual KEVLAR strands having 1420 denier, identified by Du Pont as KEVLAR 49, has been found to be particularly satisfactory for the intended purpose of the braided high strength member 18.

Depending on the selected materials from which the braided strength member 18 and tubular shield 14 are made, it may be desirable to interpose an abrasion resistant layer between the tubular shield and the braided strength member. In the illustrated embodiment, a protective abrasion resistant layer 20 is formed along and coaxially over the tubular shield 14 in closely fitting relation thereon. The abrasion resistant layer 20 may comprise a polyester film material, such as MYLAR, a product of Du Pont Company, and is formed so that the longitudinal axis of a strip of polyester film extends longitudinally along the tubular shield 14 with the opposite lateral edges 20a and 20b of the wrapped film strip preferably being in slight overlapping relation and extending longitudinally along the underlying tubular shield.

With the abrasion resistant layer 20 formed coaxially over the tubular shield 14, the braided strength member 18 is then formed coaxially over the abrasion resistant layer, as by a continuous braiding operation, so as to be formed tight against the abrasion resistant layer and underlying shield layer. By forming the braided strength member tightly against the underlying substantially radially noncompressible shield 14, the braided strength member cannot undergo a reduction in diameter which would allow undesirable longitudinal lengthening of the strength member when the fiber optic cable 10 is subjected to tensile loading.

Preferably, an outer protective jacket 24 is formed by conventional extrusion techniques coaxially along the outer peripheral surface of the braided strength member 18. The jacket 24 provides protection for the braided strength member 18 in preventing abrasion or cutting thereof, and is of conventional design and material. For example, the exterior jacket 24 may be formed from a suitable PVC or polyurethane material.

In making the fiber optic cable 10 as thus described, with an eight strand braided strength member 18 covering substantially all of the outer circumferential surface of the underlying abrasion resistant layer 20 and protective tubular shield 14, and with the individual strands of the braided strength member being made from No. 49 KEVLAR, and with the braided strength member formed over an outer diameter of approximately 0.079 inch, it has been found that the elongation and tensile strength characteristics of the cable may vary in relation to the number of picks per inch in accordance with the following table:

| Picks Per Inch | Percent Elongation at 150 lb. tensile load | Breaking Strength (lbs. force) |
|---|---|---|
| 2.28 | 1.1 | 484 |
| 3 | 1.1 | 480 |
| 3.75 | 1.2 | 400 |
| 6 | 2.1 | 385 |
| 10 | 10.8 | 230 |

From the aforedescribed table, it is seen that an eight strand braided strength member 18 having approximately 2.28-3 picks per inch results in a desirable elongation factor of approximately 1.1 percent at 150 lb. tensile load and provides a breaking strength for the corresponding fiber optic cable of approximately 480 lbs. This is particularly suitable for preventing excessive and damaging elongation of the associated fiber optic elements in the cable. Preferably, the eight strand braided strength member 18 is formed with approximately 2.28-6 picks per inch when formed on a 0.079 diameter.

Ideally, a relatively low value braid angle, i.e. few picks per inch, is desirable. However, the braid angle should not be selected at such a low value that gaps are created between the braided strands through which the tubular shield 14 and associated fiber optic element could project when the fiber optic cable is bent around curves. Should this occur, the benefit of the braided strength member would be substantially reduced.

FIGS. 3 and 4 illustrate an alternative embodiment of a fiber optic cable, indicated generally at 30, constructed in accordance with the present invention. The fiber optic cable 30 is generally similar to the aforedescribed fiber optic cable 10 except that a second braided strength member 32 is formed along the outer peripheral surface of the previously formed jacket 24 in tight fitting relation thereagainst. The braided strength member 32 is substantially the same as the braided strength member 18 and is formed from a plurality of braided strands of nonmetallic material such as yarn made from a suitable aramid, for example, KEVLAR NO. 49 wherein the individual strands are of 1420 denier. The braided strength member 32 may also be formed of eight or sixteen individual strands and formed in similar fashion to the high strength braid member 18. An outer jacket 34 is preferably formed coaxially along the length of the outer braided strength member 32 and may be formed of a suitable material, such as PVC or polyurethane.

FIGS. 5 and 6 illustrate still another embodiment of a fiber optic cable, indicated generally at 40, constructed in accordance with the present invention. The fiber optic cable 40 includes a plurality of substantially identical fiber optic bundles 42a, 42b and 42c each of which comprises a conventional fiber optic element 44 over which a protective tubular shield or sheath 46 is formed in coaxial loosely fitting relation. The coaxial sheaths 46 are preferably formed from a suitable polycarbonate material which is flexible yet sufficiently rigid to provide crush resistance. Such sheaths can be extruded with little shrink back and facilitate stripping to simplify termination of the fiber optic cables.

In the embodiment of FIGS. 5 and 6, the fiber optic bundles 42a-c are carried by an axial carrier member 48 which may comprise a relatively high strength yarn having suitable strength characteristics. For this purpose, the carrier member 48 may also be made of a suitable strength yarn made from an aramid such as KEVLAR. The fiber optic bundles 42a-c are retained in assembled relation along the length of the carrier member 48 by suitable means such as a spiral tape wrap layer 50 which extends the full length of the coaxial cable about the tube bundles so as to coaxially cover the tube bundles and axial carrier member and maintain them in assembled relation. The tape forming the cover layer or retaining layer 50 may comprise a suitable PVC tape or other suitable material such as a polyester film material. The tube bundles 42a-c are preferably helically wound about the axial carrier member 48 as illustrated in FIG. 5.

A braided strength member 18' having a substantially identical construction and physical properties as the aforedescribed braided strength member 18 is formed coaxially along the length of the wrap layer 50, underlying tubular bundles 42a-c and axial strength member 48 and has greater tensile strength and lower elongation per unit length than the fiber optic elements within the fiber optic bundles 42a-c so that a major portion of any tensile load applied to the fiber optic cable 40 is substantially taken by the braided strength member. In this manner, the braided strength member will absorb tensile loads applied to the fiber optic cable and will prevent undesirable elongation of the fiber optic elements 42a-c to a point where they could fail or otherwise be harmfully damaged so as to lose their transmitting properties. The braided strength member 18' is formed so as to fit tightly against the underlying tape layer or wrap 50 and fiber optic bundles so that tensile loading of the braided strength member does not cause a reduction in diameter thereof and a corresponding axial elongation which could result in excessive and detrimental elongation of the fiber optic elements 42a-c.

In similar fashion to the aforedescribed fiber optic cable 10, the fiber optic cable 40 of FIGS. 5 and 6 preferably has an outer protective jacket 52 formed thereon in coaxial relation along the length of the braided strength member 18'.

Thus, in accordance with the present invention, various embodiments of a novel fiber optic cable construction are provided wherein one or more fiber optic bundles in the form of one or more fiber optic elements are carried within one or more protective tubular shields over which a tubular braided strength member is tightly formed so as to maintain the fiber optic bundles in substantially fixed relative orientation. In all instances, the braided strength member has greater tensile strength and lower elongation per unit length than the associated fiber optic elements so that the braided strength member is adapted to take the major portion of any tensile load applied to the corresponding fiber optic cable and prevent the associated fiber optic elements from being subjected to tensile loading which might effect undesirable elongation thereof to a point of failure.

While preferred embodiments of the present invention have been illustrated and described, it will be understood to those skilled in the art that changes and modifications may be made therein without departing from the invention in its broader aspects. Various features of the invention are defined in the following claims.

What is claimed is:

1. A fiber optic cable comprising at least one elongated fiber optic element, a nonmetallic tubular flexible and substantially radially noncompressible shield layer disposed substantially coaxially along the length of said fiber optic element in loose fitting relation thereon, and a nonmetallic braided strength member disposed coaxially along the length of said shield layer in tight fitting relation thereon, said braided strength member consisting of a plurality of discrete strands of nonmetallic material braided together along the length of said tubular shield layer so as to cover substantially the full outer peripheral surface of said tubular shield layer, said discrete strands being braided so that the discrete strands are wound in intertwined opposite helical relation along the length of said shield layer with the strands common to each helical direction being in substantially parallel contacting relation, said braided strength member having greater tensile strength and lower elongation per unit length than said fiber optic element so that the major portion of any tensile load acting on said cable is taken substantially by said braided strength member.

2. A fiber optic cable as defined in claim 1 including an abrasion resistant layer disposed coaxially along the length of said tubular shield between said shield and said braided strength member, said abrasion resistant layer being adapted to protect said tubular shield from abrasion by said braid member.

3. A fiber optic cable as defined in claim 2 wherein said abrasion resistant layer comprises a polyester film strip applied longitudinally along said tubular shield with the longitudinal axis of said strip being substantially parallel to the longitudinal axis of said tubular shield.

4. A fiber optic cable as defined in claims 1 or 2 including a protective jacket disposed coaxially over said braided strength member along the length of said cable.

5. The fiber optic cable as defined in claim 1 wherein said tubular shield comprises a polycarbonate tubular sheath formed in loose fitting relation along the length of said fiber optic element.

6. A fiber optic cable as defined in claim 1 wherein said tubular shield layer has an outer diameter of approximately 0.079 inch, and wherein said braided strength member is braided to form approximately 2.28–6 picks per inch along the length of said tubular shield.

7. A fiber optic cable as defined in claims 1 or 6 wherein each of said discrete strands comprises a high strength yarn made from a suitable aramid material.

8. A fiber optic cable as defined in claim 1 including a plurality of fiber optic elements carried along an axial nonmetallic strength member internally of said braided strength member.

9. A fiber optic cable as defined in claim 8 wherein each of said fiber optic elements has a tubular sheath coaxially thereon, said fiber optic elements and their associated coaxial sheaths being disposed in helically wound relation about said axial strength member.

10. A method of making a flexible fiber optic cable comprising the steps of:

forming a tubular shield layer along the length of at least one fiber optic element in loose fitting relation thereon, said tubular shield layer being flexible and substantially radially noncompressible, forming a nonmetallic tubular braided strength member coaxially along the length of said tubular shield layer in tight fitting relation thereon, said braided strength member consisting of a plurality of discrete strands of nonmetallic material braided together along the length of said tubular shield layer so as to cover substantially the full outer peripheral surface of said shield layer, said discrete strands being braided so that the discrete strands are wound in intertwined opposite helical relation along the length of said shield layer with the strands common to each helical direction being in substantially parallel contacting relation, said braided strength member having greater tensile strength and lower elongation per unit length than said fiber optic element so that the major portion of a tensile load applied to the cable is taken substantially by said braided strength member, and forming an outer protective jacket coaxially along the length of said braided strength member.

11. The method as defined in claim 10 including the step of forming an abrasion resistant layer coaxially along said tubular shield prior to forming said braided strength member coaxially along the length of said tubular shield so that said abrasion resistant layer prevents abrasion of said shield by said braided strength member.

12. The method as defined in claim 10 wherein each of said discrete strands of nonmetallic material comprises a relatively high strength yarn made of a suitable aramid material.

13. The method as defined in claim 11 wherein said step of forming said abrasion resistant layer along said tubular shield comprises forming a strip layer of polyester film along the outer peripheral surface of said tubular shield such that the polyester film strip extends with its longitudinal axis substantially parallel to the axis of said tubular shield.

14. A method as defined in claim 10 wherein said tubular shield has an outer diameter of approximately 0.079 inch, and wherein said braided strength member comprises eight strands braided so as to establish approximately 2.28–6 picks per inch along the length of said shield layer.

* * * * *